(12) United States Patent
Ekici et al.

(10) Patent No.: US 12,382,375 B2
(45) Date of Patent: Aug. 5, 2025

(54) SYSTEMS AND METHODS FOR ASSISTED CELLULAR CONNECTIVITY

(71) Applicant: Apple Inc., Cupertino, CA (US)

(72) Inventors: Ozgur Ekici, Ottawa (CA); Sachin J Sane, San Jose, CA (US); Thanigaivelu Elangovan, Cupertino, CA (US); Rajesh Ambati, Los Altos Hills, CA (US); Richard B Warren, Cupertino, CA (US); Rachid Kachemir, Mountain View, CA (US); Ampy B Fejes, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 437 days.

(21) Appl. No.: 17/945,034

(22) Filed: Sep. 14, 2022

(65) Prior Publication Data

US 2024/0089841 A1    Mar. 14, 2024

(51) Int. Cl.
| | |
|---|---|
| *H04W 4/00* | (2018.01) |
| *H04W 48/16* | (2009.01) |
| *H04W 68/00* | (2009.01) |
| *H04W 76/15* | (2018.01) |
| *H04W 76/18* | (2018.01) |

(52) U.S. Cl.
CPC ......... *H04W 48/16* (2013.01); *H04W 68/005* (2013.01); *H04W 76/15* (2018.02); *H04W 76/18* (2018.02)

(58) Field of Classification Search
CPC ... H04W 4/025; H04W 68/005; H04W 76/18; H04W 76/10; H04W 4/024; H04W 76/19; H04W 28/04; H04W 72/04; H04W 72/042; H04W 88/08; H04W 28/08; H04W 28/084; H04W 36/22; H04W 72/12; H04L 5/0007
See application file for complete search history.

(56) References Cited

U.S. PATENT DOCUMENTS

| | | | |
|---|---|---|---|
| 6,721,572 B1 | 4/2004 | Smith et al. | |
| 7,113,793 B2 | 9/2006 | Veerasamy et al. | |
| 7,293,088 B2 | 11/2007 | Douglas et al. | |
| 7,551,577 B2 | 6/2009 | McRae | |
| 7,761,119 B2 | 7/2010 | Patel | |

(Continued)

FOREIGN PATENT DOCUMENTS

EP    3010274 A1    4/2016

*Primary Examiner* — Phuongchau Ba Nguyen
(74) *Attorney, Agent, or Firm* — FLETCHER YODER PC

(57) ABSTRACT

Embodiments herein provide various apparatuses and techniques for providing a notification indicating guidance to reaching cellular connectivity in the event of a loss of cellular connectivity and for guiding a user of a user equipment to a location with cellular connectivity. In an embodiment, the notification may be generated based on expiration of a timer, a screen unlock operation, or an application connection failure. The notification may indicate how long ago the cellular connectivity loss occurred and how far away a nearest location with a cellular connectivity was. In an embodiment, the user equipment may display a map interface based on user input selecting the notification. The map interface may show a map of the current location of the user equipment, a nearest location with cellular connectivity to the user equipment, and a path, which includes a tracked path of user equipment and a proposed path to the nearest location with cellular connectivity.

20 Claims, 10 Drawing Sheets

(56) References Cited

U.S. PATENT DOCUMENTS

| | | | |
|---|---|---|---|
| 8,494,563 B2 | 7/2013 | Jain et al. | |
| 8,676,502 B2 | 3/2014 | Petersen | |
| 9,057,620 B2 | 6/2015 | Dave et al. | |
| 9,080,889 B2 | 7/2015 | Shrum et al. | |
| 9,476,715 B2 | 10/2016 | Wharton et al. | |
| 9,549,421 B2 | 1/2017 | Schmidt et al. | |
| 2007/0072623 A1* | 3/2007 | Shyr | G01S 19/09 |
| | | | 455/456.1 |
| 2020/0337101 A1* | 10/2020 | Brooks | H04W 64/00 |
| 2021/0143900 A1* | 5/2021 | Edge | H04W 64/00 |
| 2022/0046424 A1* | 2/2022 | Edge | H04W 48/04 |
| 2023/0362640 A1* | 11/2023 | Edge | H04W 12/06 |
| 2023/0362704 A1* | 11/2023 | Edge | H04W 24/10 |
| 2024/0089840 A1* | 3/2024 | Ekici | H04W 76/15 |

* cited by examiner

SYSTEMS AND METHODS FOR ASSISTED CELLULAR CONNECTIVITY

BACKGROUND

The present disclosure relates generally to wireless communication, and more specifically to providing access to cellular connectivity in the absence of cellular connectivity.

User equipment may lose cellular connectivity when, for example, outside of an urban area. Such loss of cellular connectivity may prevent the user equipment from performing certain functions. For example, the user equipment may not be able to make an emergency call without access to cellular connectivity or certain applications on the electronic device may be disabled or lose functionality. Currently, user equipment may merely provide an indication of the loss of cellular connectivity (e.g., when in an off-grid area).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an electronic device comprises a display, a first receiver configured to receive a first signal associated with a first radio access technology (RAT), a second receiver configured to receive a second signal associated with a second RAT, a global navigation satellite system (GNSS) receiver, and processing circuitry communicatively coupled to the display, the first receiver, and the second receiver. The processing circuitry is configured to receive an indication that the electronic device lost connection with the first RAT and the second RAT, receive a time and a location from the GNSS receiver based on the indication, and display a notification on the display based on the time and the location.

In another embodiment, a method comprises receiving, via processing circuitry of an electronic device, an indication that the electronic device has lost a first connectivity with a first RAT and a second connectivity with a second RAT, generating, via the processing circuitry, a notification indicating a time elapsed since passing a location where the electronic device has lost the first connectivity and the second connectivity, and a distance to a nearest location with the first connectivity to the first RAT from a current location of the electronic device.

In yet another embodiment, one or more tangible, non-transitory, computer-readable media, comprises instructions that cause processing circuitry to receive an indication that an electronic device has lost first connectivity with a first RAT and a second connectivity with a second RAT, receive a time and a location form a GNSS receiver based on the indication; and generate a notification based on the time reaching a threshold, a screen unlock operation, or selection of a software application that uses the first connectivity or the second connectivity, the notification indicating a time elapsed since the electronic device lost connectivity with the first RAT and the second RAT and a distance to a nearest location with a connectivity to the first RAT from a current location of the electronic device.

In an embodiment, an electronic device comprises a display, a first receiver configured to receive a first signal associated with a first radio access technology (RAT), a second receiver configured to receive a second signal associated with a second RAT, a global navigation satellite system (GNSS) receiver, and processing circuitry communicatively coupled to the first receiver and the second receiver. The processing circuitry is configured to download crowdsourced data based on the second receiver receiving the second signal, the crowdsourced data comprising coverage information of a first RAT, receive a location of a first connectivity loss and begin receiving a current location of the electronic device from the GNSS receiver based on an indication that the first receiver lost first connectivity with the first RAT and the second receiver lost second connectivity with the second RAT, and receive an indication of a nearest location with the first connectivity based on the current location of the electronic device and on the crowdsourced data, the nearest location with the first connectivity comprising a location where the first receiver receives the first signal associated with the first RAT.

In another embodiment, an method comprises downloading, via processing circuitry of an electronic device, crowdsourced data based on a first receiver receiving a first signal associated with a first RAT, the crowdsourced data comprising known locations with a first connectivity with the first RAT and known locations without the first connectivity within a threshold distance of the electronic device, receiving, via the processing circuitry, a current location of the electronic device from a GNSS receiver based on the first receiver losing the first connectivity with the first RAT and a second receiver losing a second connectivity with a second RAT, receiving, via the processing circuitry, an indication of a proposed path from the current location of the electronic device to a nearest location with the first connectivity based on the current location of the electronic device and on the crowdsourced data, and receiving, via the processing circuitry, an indication of a tracked path of the electronic device from a location with the first connectivity to the current location of the electronic device received from the GNSS receiver.

In yet another embodiment, one or more tangible, non-transitory, computer-readable media, comprises instructions that cause processing circuitry to display, via a display of an electronic device, a notification indicating current absence of a first connectivity with a first RAT and a guidance to reaching the first connectivity, display, via the display, a map interface comprising a proposed path from a current location of the electronic device to a nearest location with the first connectivity with the first RAT, and provide, via the display, a speaker of the electronic device, or both, navigation commands for reaching the nearest location with the first connectivity with the first RAT.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
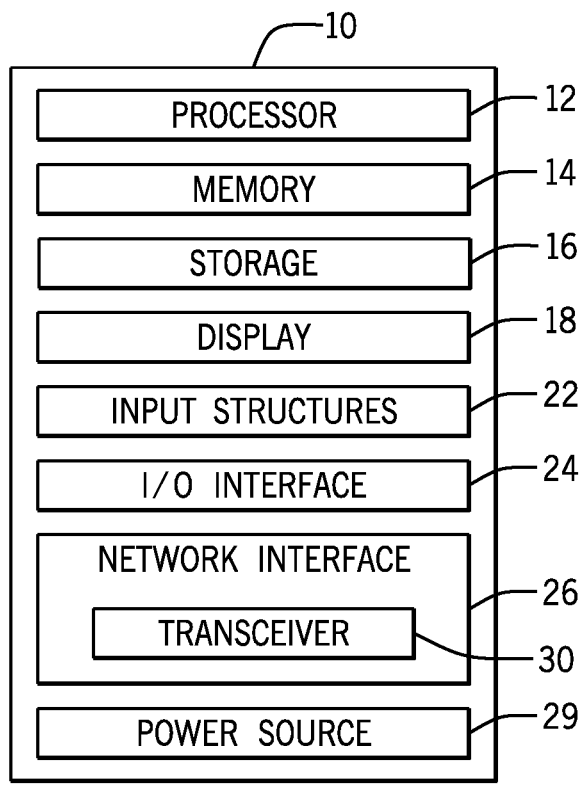
FIG. 1 is a block diagram of a user equipment, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members.

This disclosure is directed to providing access to cellular connectivity when user equipment is off-grid (e.g., in an area without cellular connectivity). If the user equipment is off-grid, it may not have capability to perform certain functions, such as making phone calls or running certain software applications (e.g., a web browser). However, even when the user equipment is off-grid, cellular connectivity may be within reach or close by. Indeed, most of the off-grid locations in the U.S. have cellular connectivity within a one kilometer (km) distance. Currently, user equipment may merely provide a notification of loss of cellular connectivity when in an off-grid area. However, it is presently recognized that providing guidance to a location with cellular connectivity if the user equipment is off-grid may be desirable.

Embodiments herein provide various techniques to provide notifications of cellular connectivity loss and of guidance to reaching cellular connectivity, as well as techniques to present a map view of a path for reaching cellular connectivity. The techniques to notify a user of the cellular connectivity loss and of the guidance to reaching cellular connectivity include recording a time of cellular connectivity loss, tracking location of the user equipment, and starting an off-grid timer, based on determining that the user-equipment is off-grid. If the user equipment has not regained cellular connectivity (e.g., a cellular signal), expiration of the off-grid timer, an indication of a screen unlock operation (e.g., performed by a user), or an indication of a software application connection failure may trigger display of a notification indicating the loss of cellular connectivity and guidance to reaching cellular connectivity. In particular, the notification may display text indicating that cellular connectivity loss has occurred X minutes ago and/or nearest location with cellular connectivity is Y meters away. The distance to the nearest location with cellular connectivity may be determined based on crowdsourced data of known locations with and/or without cellular service as well as based on location information and cellular availability information collected by the user equipment. Such crowdsourced data may include metadata collected from various mobile devices and/or may be downloaded by the user equipment when the user equipment is connected to Wi-Fi.

The techniques to provide guidance to cellular connectivity include displaying a map view of the current location of the user equipment, a nearest location with cellular connectivity to the user equipment, a path traveled by the user equipment from an area with cellular connectivity to the current location, and/or a proposed path to the nearest location with cellular connectivity. The path traveled and the proposed path may be color-coded to indicate, using various colors, segments of the paths where cellular connectivity is present, segments where only emergency calls may be made, and regions without cellular connectivity. For example, segments where cellular connectivity is present may be green, segments where only emergency calls may be made may be orange, and regions without cellular connectivity may be red. In addition, the map view may include a button or a prompt that may be selected (e.g. by the user) to be routed to the location with cellular connectivity. If selected, the user equipment may provide visual and/or verbal navigation instructions to reach the nearest location with cellular connectivity.

FIG. 1 is a block diagram of a user equipment 10, according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the user equipment 10.

By way of example, the user equipment 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FTC)), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 26 may include, for example, one or more interfaces for using a cellular communication standard of the 5G specifications that include the millimeter wave (mmWave) frequency range (e.g., 24.25-300 gigahertz (GHz)) that defines and/or enables frequency ranges used for wireless communication. The network interface 26 of the user equipment 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the user equipment 10 may include any suitable source of power, such as a rechargeable lithium polymer (Li-poly) battery and/or an alternating current (AC) power converter.

Figure 2:
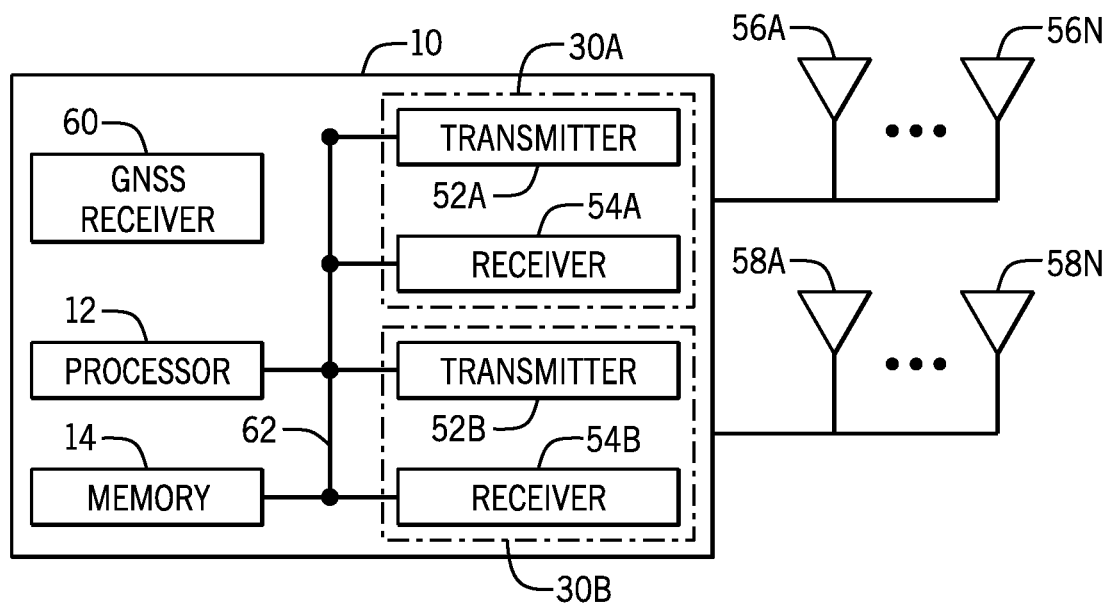
FIG. 2 is a functional diagram of the user equipment of FIG. 1, according to embodiments of the present disclosure.

FIG. 2 is a functional diagram of the user equipment 10 of FIG. 1, according to embodiments of the present disclosure. As illustrated, the processor 12, the memory 14, the transceivers 30A, 30B (collectively 30), transmitters 52A, 52B (collectively 52), receivers 54A, 54B (collectively 54), antennas 56A-56N (collectively 56) and 58A-58N (collectively 58), and/or a global navigation satellite system (GNSS) receiver 60 may be communicatively coupled directly or indirectly (e.g., through or via another component, a communication bus, a network) to one another to transmit and/or receive data between one another.

The user equipment 10 may include the transmitters 52 and/or the receivers 54 that respectively enable transmission and reception of data between the user equipment 10 and an external device via, for example, a network (e.g., including base stations or access points) or a direct connection. As illustrated, a transmitter 52 and a receiver 54 may be combined into a transceiver 30. The user equipment 10 may also have one or more antennas 56, 58 electrically coupled to the transceiver 30. The antennas 56, 58 may be configured in an omnidirectional or directional configuration, in a single-beam, dual-beam, or multi-beam arrangement, and so on. Each antenna 56, 58 may be associated with one or more beams and various configurations. In some embodiments, multiple antennas of the antennas 56, 58 of an antenna group or module may be communicatively coupled to a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

In some embodiments, the user equipment 10 may communicatively couple to a first communication network (e.g., a cellular network) using a first transceiver 30A via a first set of antennas 56, and communicatively couple to a second communication network (e.g., a Wi-Fi network) using a second transceiver 30B via a second set of antennas 58.

The user equipment 10 may include the GNSS receiver 60 that may enable the user equipment 10 to receive GNSS signals from a GNSS network that includes one or more GNSS satellites or GNSS ground stations. The GNSS signals may include a GNSS satellite's observation data, broadcast orbit information of tracked GNSS satellites, and supporting data, such as meteorological parameters, collected from co-located instruments of a GNSS satellite. For example, the GNSS signals may be received from a Global Positioning System (GPS) network, a Global Navigation Satellite System (GLONASS) network, a BeiDou Navigation Satellite System (BDS), a Galileo navigation satellite network, a Quasi-Zenith Satellite System (QZSS or Michibiki) and so on. The GNSS receiver 60 may process the GNSS signals to determine a global position of the user equipment 10.

As illustrated, the various components of the user equipment 10 may be coupled together by a bus system 62. The bus system 62 may include a data bus, for example, as well as a power bus, a control signal bus, and a status signal bus, in addition to the data bus. The components of the user equipment 10 may be coupled together or accept or provide inputs to each other using some other mechanism.

Figure 3:
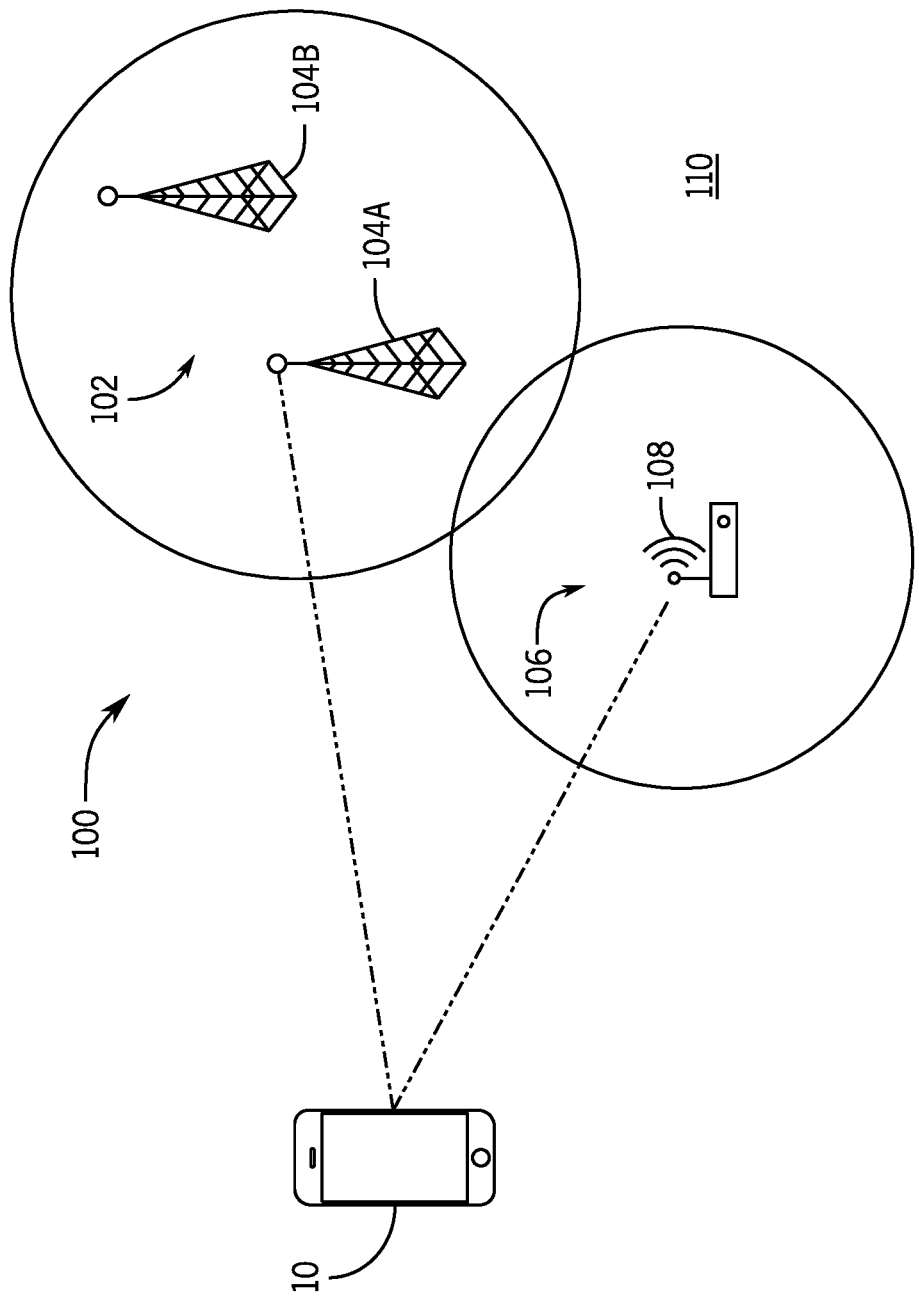
FIG. 3 is a schematic diagram of a communication system including the user equipment of FIG. 1 communicatively coupled to a cellular communication network supported by base stations and to a Wi-Fi network supported by a Wi-Fi router, according to embodiments of the present disclosure.

FIG. 3 is a schematic diagram of a communication system 100 including the user equipment 10 of FIG. 1 communicatively coupled to two networks that are each associated with a radio access technology such (RAT), according to embodiments of the present disclosure. In particular, a first RAT may include a cellular communication technology associated with a cellular communication network 102 and supported by base stations 104A, 104B (collectively 104) and a second RAT may include a Wi-Fi technology associated with a wireless Wi-Fi network 106 and supported by a Wi-Fi router or access point 108. In particular, the base stations 104 may include Next Generation NodeB (gNodeB or gNB) base stations and may provide 5G/NR coverage via the cellular communication network 102 to the user equipment 10. The base stations 104 may include any suitable electronic device, such as a communication hub or node that facilitates, supports, and/or implements the network 102. In some embodiments, the base stations 104 may include Evolved NodeB (eNodeB) base stations and may provide 4G/LTE coverage via the cellular communication network 102 to the user equipment 10. Each of the base stations 104 may include at least some of the components of the user equipment 10 shown in FIGS. 1 and 2, including one or more processors 12, the memory 14, the storage 16, the transceiver 30, the transmitter 52, the receiver 54, and the associated circuitry shown in FIG. 2. It should be understood that while the present disclosure may use 5G/NR as an example specification or standard, the embodiments disclosed herein may apply to other suitable specifications or standards (e.g., such as the 4G/LTE specification). Moreover, the cellular communication network 102 may include any suitable number of base stations 104 (e.g., one or more base stations 104, four or more base stations 104, ten or more base stations 104, and so on).

Connecting to the cellular communication network 102 may enable the user equipment 10 to access the Internet, as well as send and receive data. However, if the user equipment 10 is too far from the base station 104 or if there are certain obstacles between the base station 104 and the user equipment 10, the cellular signal may be too weak to effectively transmit or receive data or be unable to reach the user equipment 10. When this happens, the user equipment 10 may be outside of the cellular communication network 102. Similarly, the user equipment 10 may connect to the Internet via a wireless Wi-Fi network 106 and exchange data by sending and receiving Wi-Fi signal. However, the Wi-Fi signal may typically travel relatively short distances. Thus, if the user equipment 10 is not near the Wi-Fi router 108, it may not receive a Wi-Fi signal with sufficient signal strength to exchange data. Accordingly, the areas covered by the cellular communication network 102 and the wireless Wi-Fi network 106, respectively, may be limited. It should be appreciated that the Wi-Fi router 108 may include any suitable device that facilitates Wi-Fi connection such as a Wi-Fi modem and/or a Wi-Fi access point. In addition, the Wi-Fi network 106 may include any suitable number of routers 108. Moreover, while the present disclosure may use Wi-Fi as an example specification or standard, the embodiments disclosed herein may apply to other suitable specifications or standards (e.g., such as Bluetooth).

The user equipment 10 is said to be off-grid when it does not have connectivity with either the first RAT or the second RAT. In particular, the user equipment 10 may be off-grid when it is outside the cellular communication network 102 and outside a wireless Wi-Fi network 106, as shown by an area 110 in FIG. 3. When off-grid, the user equipment 10 may not have the capability to perform certain operations, such as accessing the Internet, streaming media, or making phone calls, which may require Wi-Fi or cellular connectivity. Conversely, if the user equipment 10 is within reach of either cellular signals from one or more base stations 104 or Wi-Fi signals from one or more Wi-Fi routers 108, the user equipment 10 may not be off-grid, even if it does not have the capability to access the Internet, and perform aforementioned operations.

As discussed, when the user equipment 10 is off-grid, it may be within reach (e.g., within a threshold range or distance) of a location covered by the cellular communication network 102. However, this information may not be known to the user of the user equipment 10. Furthermore, the user may not know where the nearest location with cellular connectivity is. Thus, as discussed, it may be desirable to provide the user with a notification (e.g., a pop-up notification, push notification, a lock screen notification, an alert, a banner notification, badge notification) indicating that the user equipment 10 is outside of the cellular communication network 102 and that the nearest location within the network 102 is a certain distance away.

Figure 4:
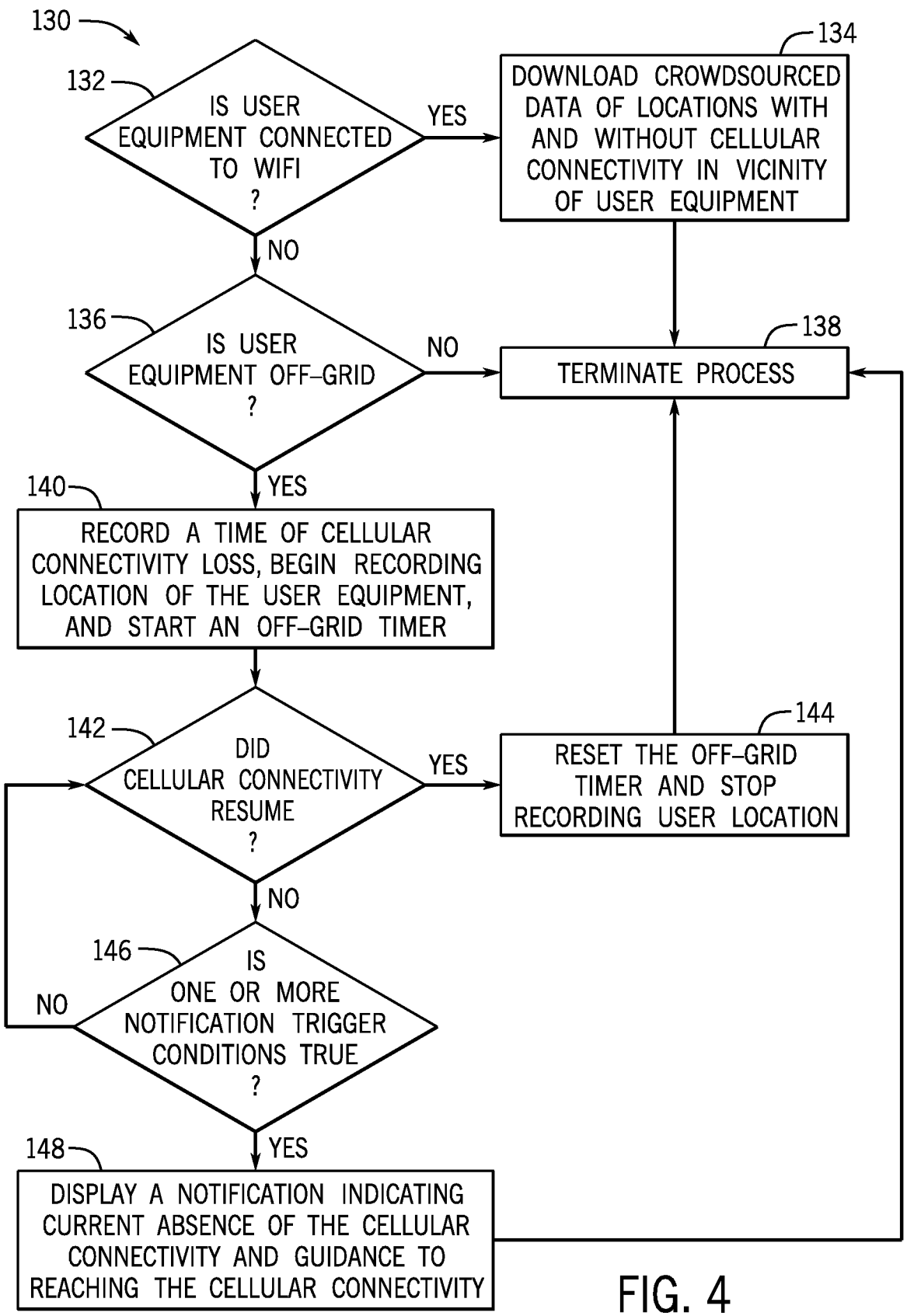
FIG. 4 is a flow diagram of a method for generating a notification indicating a loss of cellular connectivity and guidance to reaching cellular connectivity when the user equipment of FIG. 1 is off-grid, according to embodiments of the present disclosure.

With the foregoing in mind, FIG. 4 is a flow diagram of a method 130 for generating a notification indicating a loss of connectivity with a first RAT (e.g., cellular connectivity) and reaching connectivity with the first RAT when the user equipment 10 of FIG. 1 is off-grid, according to embodiments of the present disclosure. In particular, the notification may indicate that a loss of cellular connectivity has occurred and provide guidance to reaching the cellular connectivity. Any suitable device (e.g., a controller) that may control components of the user equipment 10, such as the processor 12, may perform the method 130. In some embodiments, the method 130 may be implemented by executing instructions stored in a tangible, non-transitory, computer-readable medium, such as the memory 14 or storage 16, using the processor 12. For example, the method 130 may be performed at least in part by one or more software components, such as an operating system of the user equipment 10, one or more software applications of the user equipment 10, and the like. While the method 130 is described using steps in a specific sequence, it should be understood that the present disclosure contemplates that the described steps may be performed in different sequences than the sequence illustrated, and certain described steps may be skipped or not performed altogether.

In decision block 132, the processor 12 determines whether the user equipment 10 is connected to a second RAT (e.g., connected to the wireless Wi-Fi network 106). For example, the processor 12 may detect a Wi-Fi signal from a Wi-Fi router 108 and if the Wi-Fi signal is detected, the processor 12 may determine whether data traffic (e.g., data packets) is being exchanged with the Wi-Fi router 108. Exchange of data traffic with the Wi-Fi router 108 may indicate that the user equipment 10 is connected to Wi-Fi.

If the processor 12 determines, or receives an indication that, the user equipment 10 is connected to Wi-Fi, then the processor 12 may cause a receiver (e.g., 54B) of the user equipment 10 to download crowdsourced data indicating locations with and without connectivity with the first RAT (e.g., cellular connectivity) in vicinity of the user equipment 10 (block 134). For example, the user equipment 10 may download crowdsourced data indicating locations with and without cellular connectivity in an area within a threshold radius (e.g., five km or less, ten km or less, 20 km or less, 50 km or less, 100 km or less, 100 km or more, and so on) of the user equipment 10. In addition, before downloading the crowdsourced data for an area, the user equipment 10 may first perform a check of whether the crowdsourced data for that area is already stored in its memory 14. For instance, if the user equipment 10 has recently downloaded crowdsourced data for an area, the crowdsourced data for that area may not need to be downloaded again. In an embodiment, the user equipment 10 may update the crowdsourced data for an area if such data has already exists in its memory 14, but has been stored before a certain date (e.g., has a threshold age). In process block 138, the processor 12 terminates the process associated with the method 130 (e.g., the process terminates once the crowdsourced data has been downloaded).

The crowdsourced data may include information specifying the off-grid locations (e.g., locations lacking cellular service) and locations with cellular connectivity (e.g., location with cellular service) in an area (e.g., within a threshold range or distance from the user equipment 10). The crowdsourced data may be based on metadata collected from various electronic devices. Such metadata may include time-stamped global navigation satellite system (GNSS) location coordinates (which may include Global Positioning System (GPS) coordinates), indication of a presence of a cellular and/or Wi-Fi signal associated with each GNSS location coordinate, signal strength of cellular signal and/or Wi-Fi signal associated with each GNSS location coordinate, and so on. The metadata from various devices may be aggregated on a server and processed to harvest information of cellular off-grid and in-service areas in various geographical regions. In particular, the processed data may be indexed to crate tuples of off-grid location coordinates and coordinates of closest corresponding locations with cellular connectivity, which may be served to user equipment 10 connected to Wi-Fi.

It should be appreciated that the crowdsourced data may generally be downloaded and/or updated any time the user equipment 10 is connected to the Internet. In an embodiment, the crowdsourced data may be updated when the cellular connectivity is present (e.g., user equipment 10 is part of cellular communication network 102). For example, download of the crowdsourced data may be triggered by an indication that user equipment 10 has entered or nearing a location for which no crowdsourced data has been stored. In addition, download of the crowdsourced data may be triggered by user input. For example, user may select to download crowdsourced data for an area in anticipation of visiting that area. In another example, the user equipment 10 may periodically or regularly attempt to download the crowdsourced data (e.g., every day or more frequently, every week or more frequently, every month or more frequently, every year or more frequently, and so on).

If it is determined that the user equipment 10 is not connected to Wi-Fi (e.g., the user equipment 10 is having a Wi-Fi connectivity loss), the processor 12 determines whether the user equipment 10 is off-grid (decision block 136). The decision as to whether the user equipment 10 is off-grid may be based on two conditions being true: the user equipment 10 does not have cellular connectivity (e.g., user equipment 10 has a cellular connectivity loss) and the user equipment 10 is in a remote location. The user equipment 10 may not have cellular connectivity if the user equipment 10 does not receive a cellular signal from the base station 104 or if the signal strength (e.g., reference signal received power) of the signal from the base station is below a certain threshold level (e.g., −50 decibel milliwatts (dBm) or less, −80 dBm or less, −100 dBm or less, and so on). However, a lack of cellular signal alone does not necessarily mean that the user equipment 10 is off-grid. For example, when user equipment 10 is in a dense environment (e.g., a building, a city, an elevator), cellular signal may be blocked by certain structures. Yet, a relatively small positional displacement may bring the user equipment 10 into an area where the cellular signal is not being blocked. To ensure that the user equipment 10 is truly off-grid, the processor 12 may determine, or receive an indication that, the user equipment 10 is in a remote location, such as an area sparsely covered by Wi-Fi routers 108 and base stations 104. In an embodiment, determining whether the user equipment 10 is in a remote location may be based on the crowdsourced data. For example, the crowdsourced data may indicate that a location has a low density of Wi-Fi routers 108 (e.g., below a threshold density), suggesting that the location is remote. In another example, the crowdsourced data may indicate that an area has many locations or areas with cellular connectivity in close proximity, suggesting that the area is not remote. In another embodiment, the user equipment 10 may determine whether the user equipment 10 is in a remote location based on a database of survey data assembled by a government, an organization, a company, and/or another such entity. For example, the survey data may include information about locations that are designated as remote (e.g., rural, sparsely populated) and developed (e.g., urbanized, densely populated). Similar to the crowdsourced data, the survey data may be downloaded to user equipment 10 and used to determine whether the current location of the user equipment 10 is remote.

If user equipment 10 is not off-grid, the processor 12 terminates the process associated with the method 130 (process block 138). If, on the other hand, the user equipment 10 is off-grid, the processor 12 records a time of cellular connectivity loss (e.g., a time when it was determined that user equipment 10 is no longer connected to the cellular communication network 102), begins recording or storing a location of the user equipment 10, and starts an off-grid timer (process block 140). Recording the time of the cellular connectivity loss, beginning to track the location of the user equipment 10, and starting the off-grid timer may enable or facilitate generating a notification indicating a loss of cellular connectivity and guidance to reaching the cellular connectivity, as well as triggering display of the notification. In various embodiments, the notification may be a pop-up notification, push notification, badge notification, a lock screen notification, an alert, and/or a banner notification.

In decision block 142, the processor 12 determines whether (or receives an indication that) the cellular connectivity has resumed. In particular, the processor 12 may check whether user equipment 10 is receiving a cellular signal with the signal strength above a threshold strength level, e.g., due to having entered an area closer to the base station 104. For example, signal strength of the cellular signal received via the transceiver 30 of the user equipment 10 may have increased from a lower signal strength to a higher signal strength (e.g., −125 dBm to −80 dBm). If the cellular connectivity has resumed, then the processor 12 resets the off-grid timer and stops recording the user location (process block 144). In process block 138, the processor 12 terminates the process associated with the method 130 (e.g., the process terminates once the off-grid timer is reset and the tracking of the user location is terminated).

If the cellular connectivity has not resumed, the processor 12 determines whether (e.g., receives an indication of) one or more notification trigger conditions are true (decision block 146). The notification trigger conditions may include expiration of the off-grid timer, an indication of a screen unlock operation, and/or an indication of an application connection failure of a software application. In various embodiments, these notification trigger conditions may trigger display of the notification. For instance, in an embodiment, the off-grid timer may count down the time from the time of the loss of cellular connectivity to the time when a notification is displayed. If the timer is set to five minutes, the notification will be displayed five minutes after the user equipment 10 has lost cellular connectivity. In an embodiment, a screen unlock operation performed on the user equipment 10 (e.g., by the user) may indicate that there is an attempt to utilize the cellular connectivity capabilities of the user equipment 10. Thus, the screen unlock operation may be used to trigger display of the notification. In another embodiment, if a software application (e.g., a telephony application, web browser application, media streaming application, videoconferencing application, or the like) of the user equipment 10 attempts to initiate cellular connectivity, then the processor 12 may attribute or associate a connection failure to a lack of cellular service (e.g., disconnection from the cellular communication network 102), and may trigger display of the notification via the display 18 of the user equipment 10. In an embodiment, the user may select, via settings of the user equipment 10, the preferred trigger condition for the display of the notification.

If the one or more notification trigger conditions is not true, the processor 12 determines whether (or receives an indication that) cellular connectivity resumed (decision block 142). However, if, the one or more notification trigger conditions are true, the processor 12 causes the display 18 of the user equipment 10 to display the notification indicating current absence of cellular connectivity and guidance to reaching cellular connectivity (process block 148). In an embodiment, the notification may indicate an amount of time elapsed since cellular connectivity was lost and/or a distance to a location with the nearest cellular connectivity. For example, the notification may include text to be displayed indicated that the user equipment 10 has been in an area with no cellular connectivity for ten minutes and that the closest area with cellular connectivity is 100 meters away. In an alternative embodiment, the notification may indicate a distance from which connectivity loss occurred and an amount of time it may take to reach the nearest location with cellular connectivity (e.g., based on walking, biking, driving, or the like). Generally, time and/or distance units may be used to indicate a departure from the last-visited location with cellular connectivity and guidance to reaching a location with cellular connectivity. In process block 138, the processor 12 terminates the process associated with the method 130 (e.g., process terminates after the notification has been displayed).

The processor 12 may estimate the distance from the last-visited location with cellular connectivity based on the tracked location of the user equipment 10, which may be collected from the location where the user equipment 10 went off-grid. In addition, the time (e.g., of cellular connectivity loss) that was recorded when the user equipment 10 went off-grid may be stored and accessed in the memory 14 of the user equipment 10. The distance or time to the nearest location with cellular connectivity may be determined based on the crowdsourced data. For example, the processor 12 may access the crowdsourced data to fetch the tuples of known off-grid and in-service areas and may identify current location of the user equipment 10 as corresponding to one of the tuples. Alternatively, the processor 12 may determine the distances from the current location of the user equipment 10 to known in-service locations, and select the known in-service location with the shortest distance. In certain cases, the nearest in-service location may be the location where the user equipment 10 has lost cellular connectivity.

Figure 5:
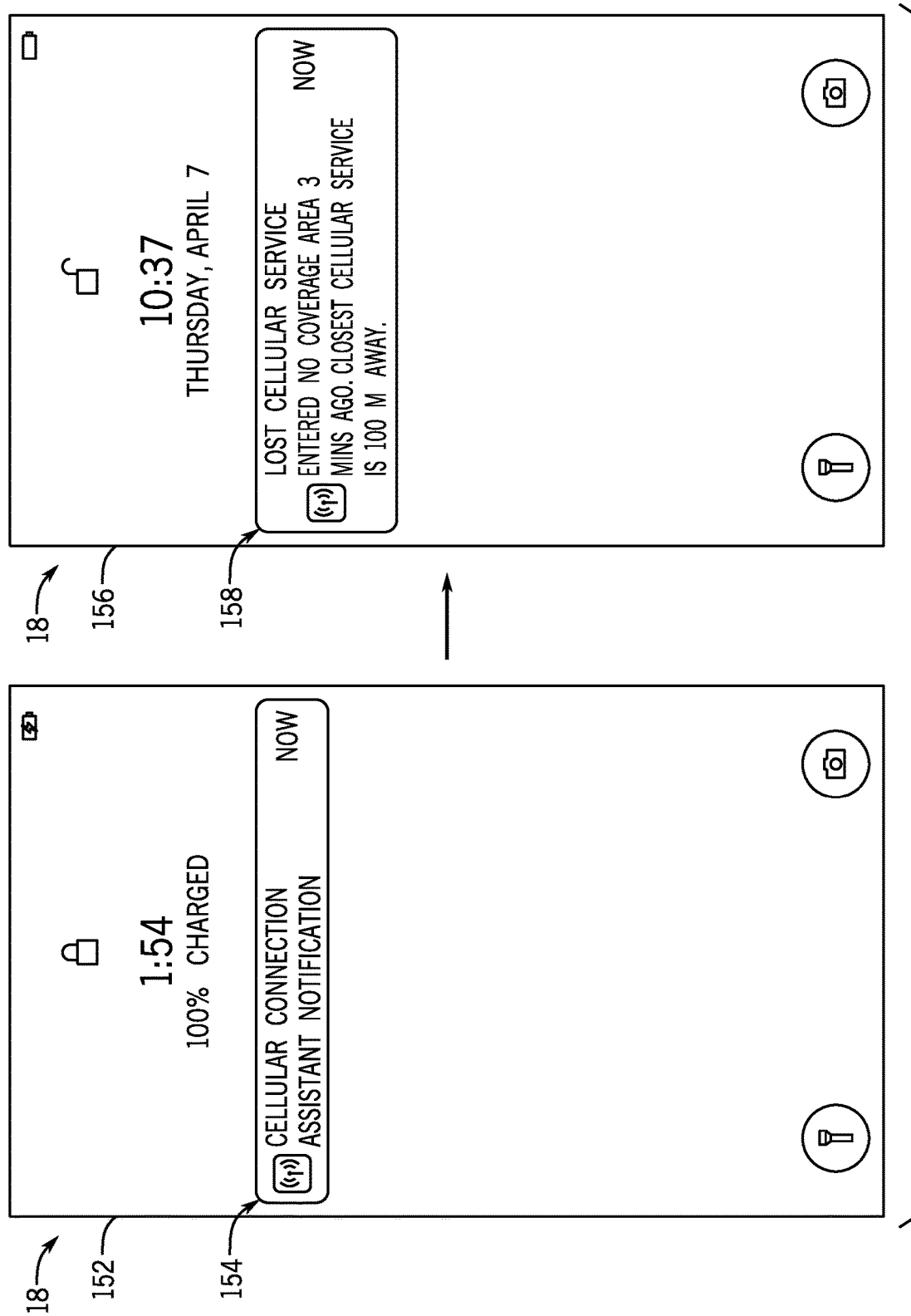
FIG. 5 is an illustration of the notification of FIG. 4 being triggered by an off-grid timer expiration, according to embodiments of the present disclosure.
Figure 6:
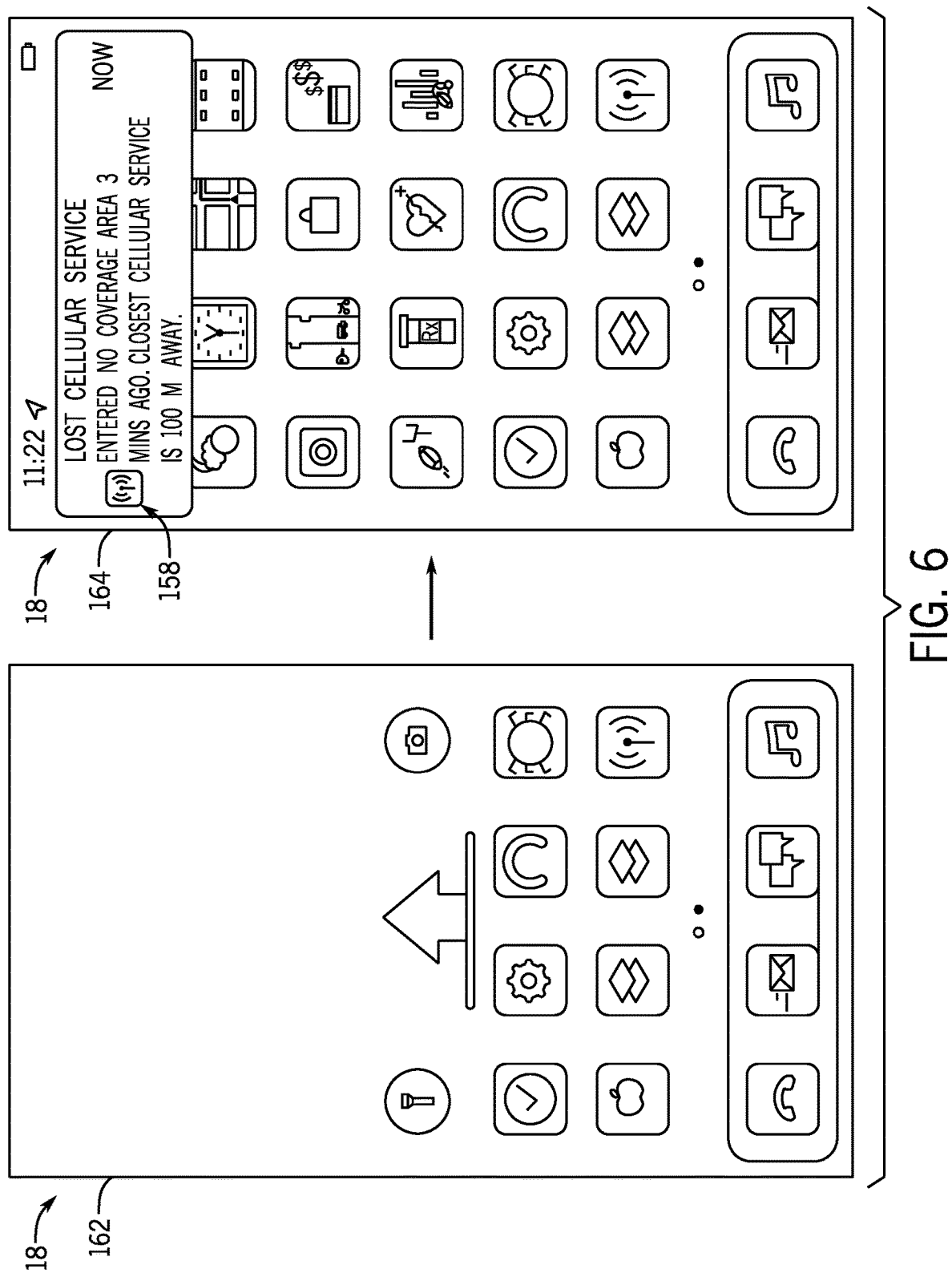
FIG. 6 is an illustration of the notification of FIG. 4 being triggered by a screen unlock operation, according to embodiments of the present disclosure.

FIGS. 5-9 illustrate various scenarios in which the notification indicating the loss of cellular connectivity and the guidance to reaching cellular connectivity (also referred to herein simply as the "notification") appears on the display 18 of the user equipment 10 with each illustrated scenario corresponding to one of the aforementioned notification trigger conditions. FIG. 5 is an illustration of a notification 158 on the display 18 of FIG. 1 being triggered by off-grid timer expiration, according to embodiments of the present disclosure. In particular, once the off-grid timer expires, the user equipment 10 may display a locked screen interface 152 including a notification preview 154, which indicates that there is a notification 158 from a software application (e.g., a cellular connection assistant application). The user may unlock the locked screen interface 152 (e.g., by inputting a code, scanning a fingerprint, etc.) to view the notification 158 on the unlocked screen interface 156. As shown, the notification 158 may indicate, for example, that the user equipment 10 has entered a no-coverage area three minutes ago and that the closest cellular service is 200 meters away. FIG. 6 is an illustration of the notification 158 on the display 18 of FIG. 1 being triggered by a screen unlock operation (e.g., as performed by the user), according to embodiments of the present disclosure. For example, the user equipment 10 may display a locked home screen interface 162 when off-grid. If the user has performs a screen unlock operation (e.g., by inputting a code, scanning a fingerprint, etc.), the user equipment 10 may display the notification 158 on the unlocked home screen interface 164.

Figure 7:
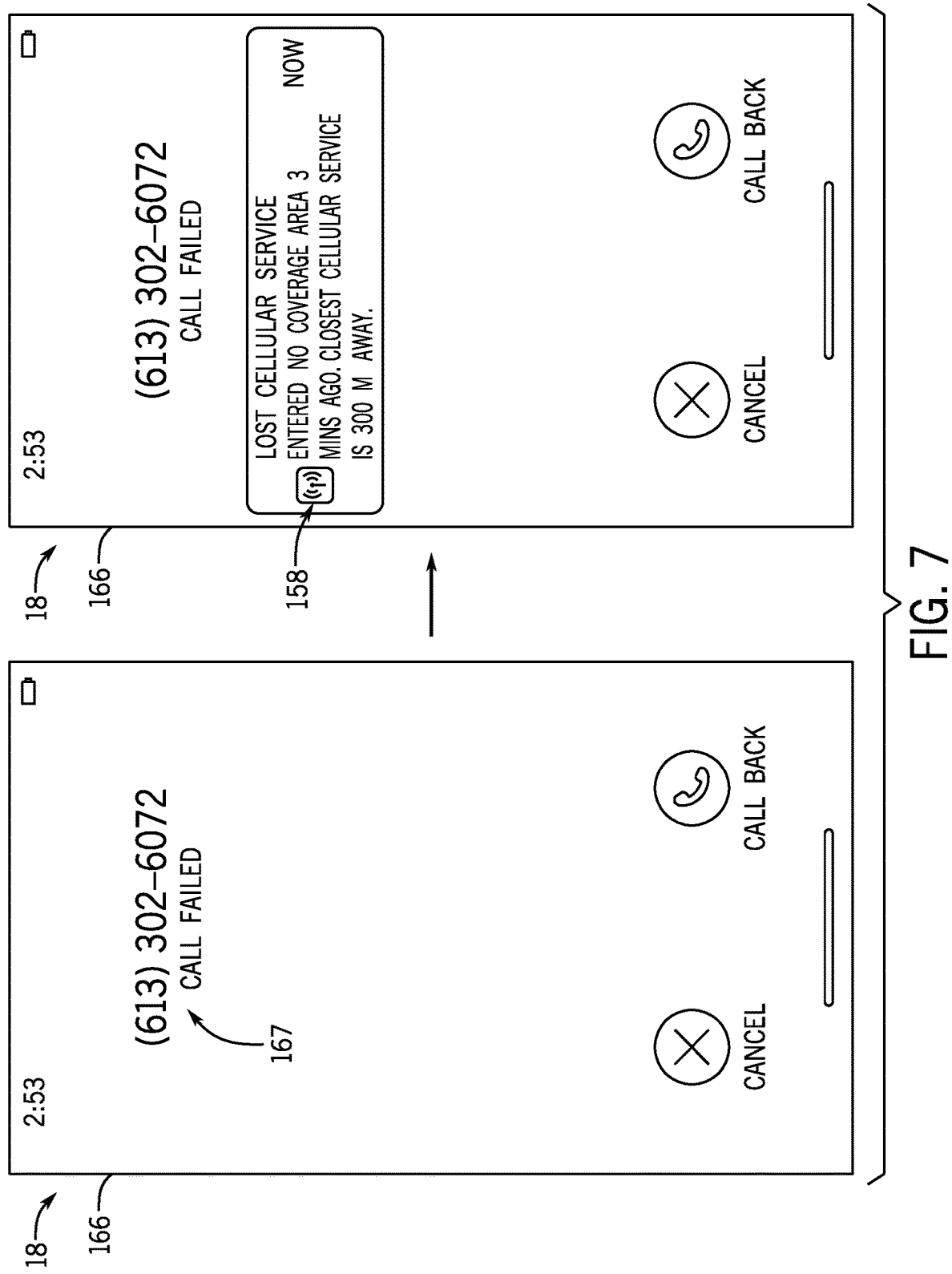
FIG. 7 is an illustration of the notification of FIG. 4 being triggered by a connection failure of a phone application, according to embodiments of the present disclosure.
Figure 8:
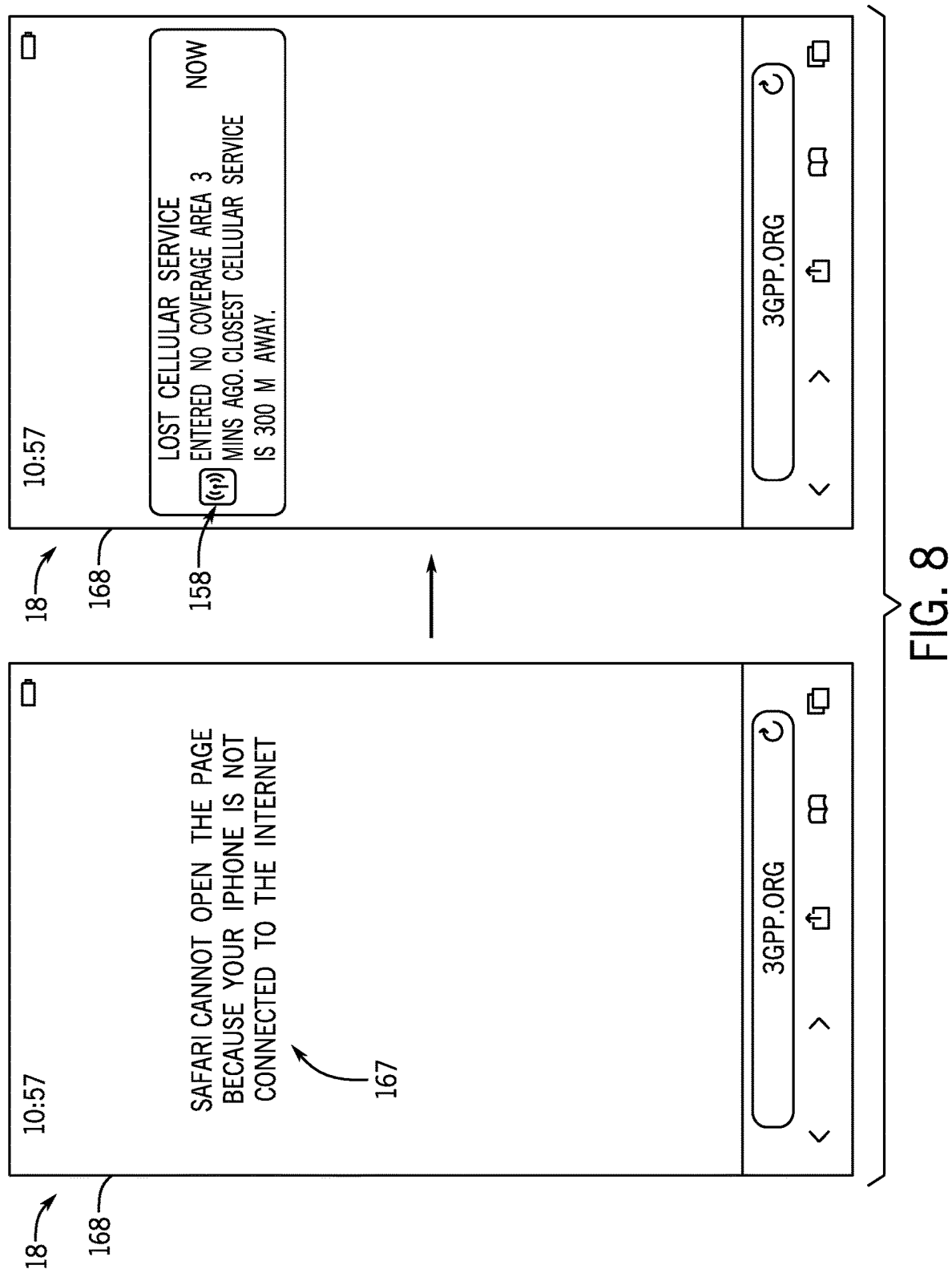
FIG. 8 is an illustration of the notification of FIG. 4 being triggered by connection failure of a web browser application, according to embodiments of the present disclosure.
Figure 9:
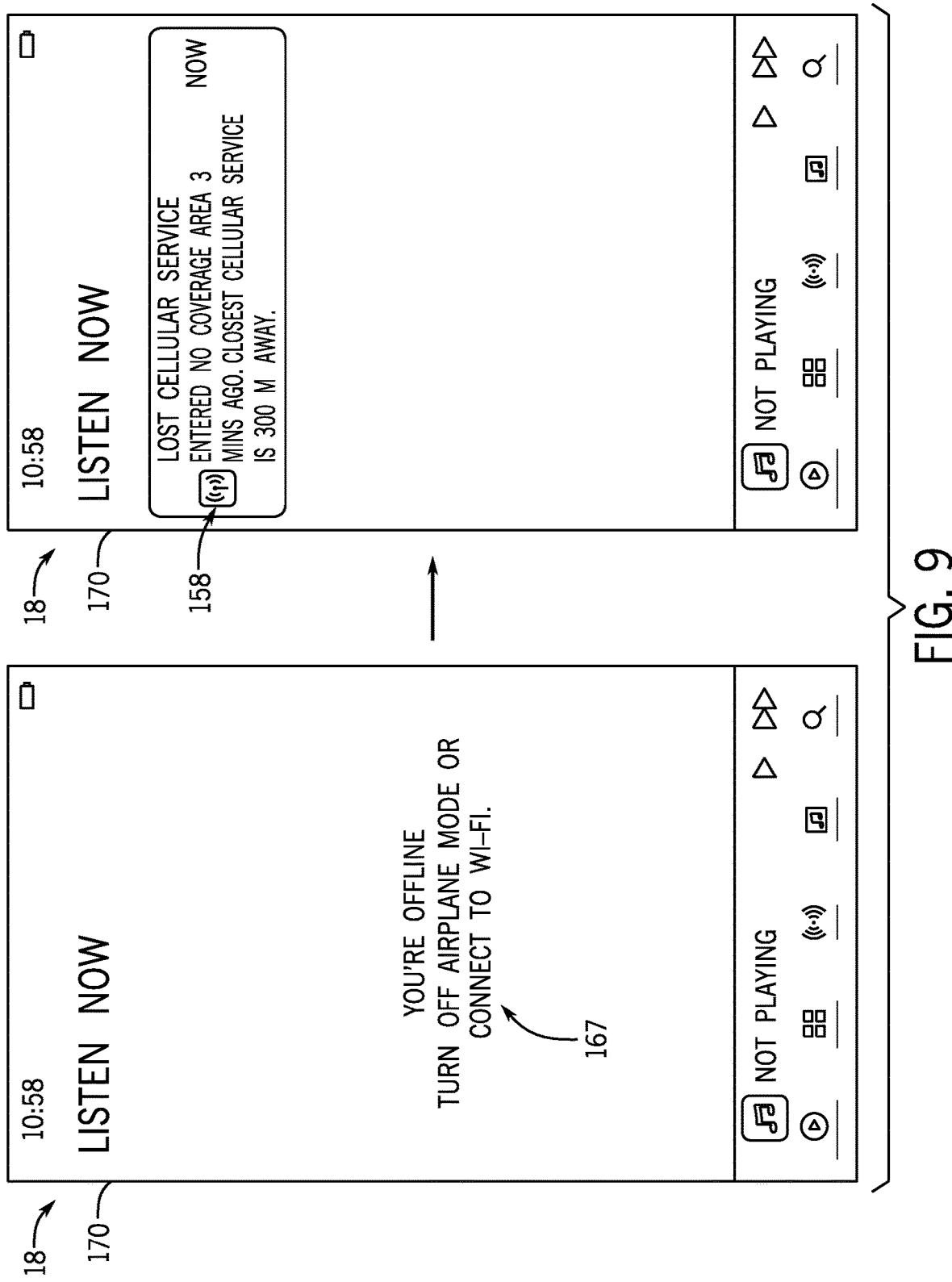
FIG. 9 is an illustration of the notification of FIG. 4 being triggered by connection failure of a media streaming application, according to embodiments of the present disclosure.

FIGS. 7-9 include additional examples of the notification 158 being triggered by connection failures of various applications. FIG. 7 is an illustration of the notification 158 on the display 18 of FIG. 1 being triggered by a connection failure of a telephony application, according to embodiments of the present disclosure. For example, if a user has attempted to make a phone call and the phone call has failed as shown by a connection failure message 167 on telephony application interface 166, the user equipment 10 may next display the notification 158 on the phone application interface 166 indicating that the phone call failed due to loss of cellular service. FIG. 8 is an illustration of the notification 158 on the display 18 of FIG. 1 being triggered by connection failure of a web browser application (e.g., Safari), according to embodiments of the present disclosure. For example, after the web browser application interface 168 displays the connection failure message 167, the user equipment 10 may display the notification 158 as part of the web browser application interface 168. FIG. 9 is an illustration of the notification 158 on the display 18 of FIG. 1 being triggered by the connection failure of a media streaming application (e.g., Apple Music), according to embodiments of the present disclosure. For example, after a media streaming application interface 170 indicates that the user equipment 10 is offline (e.g., off-grid, unable to connect to the Internet) via the connection failure message 167, the media streaming application interface 170 may display the notification 158. It should be understood that a connection failure (e.g., failure to connect to cellular service) of any software application (e.g., WhatsApp, YouTube, Amazon, etc.) installed on the user equipment 10 may trigger the display of the notification 158.

Figure 10:
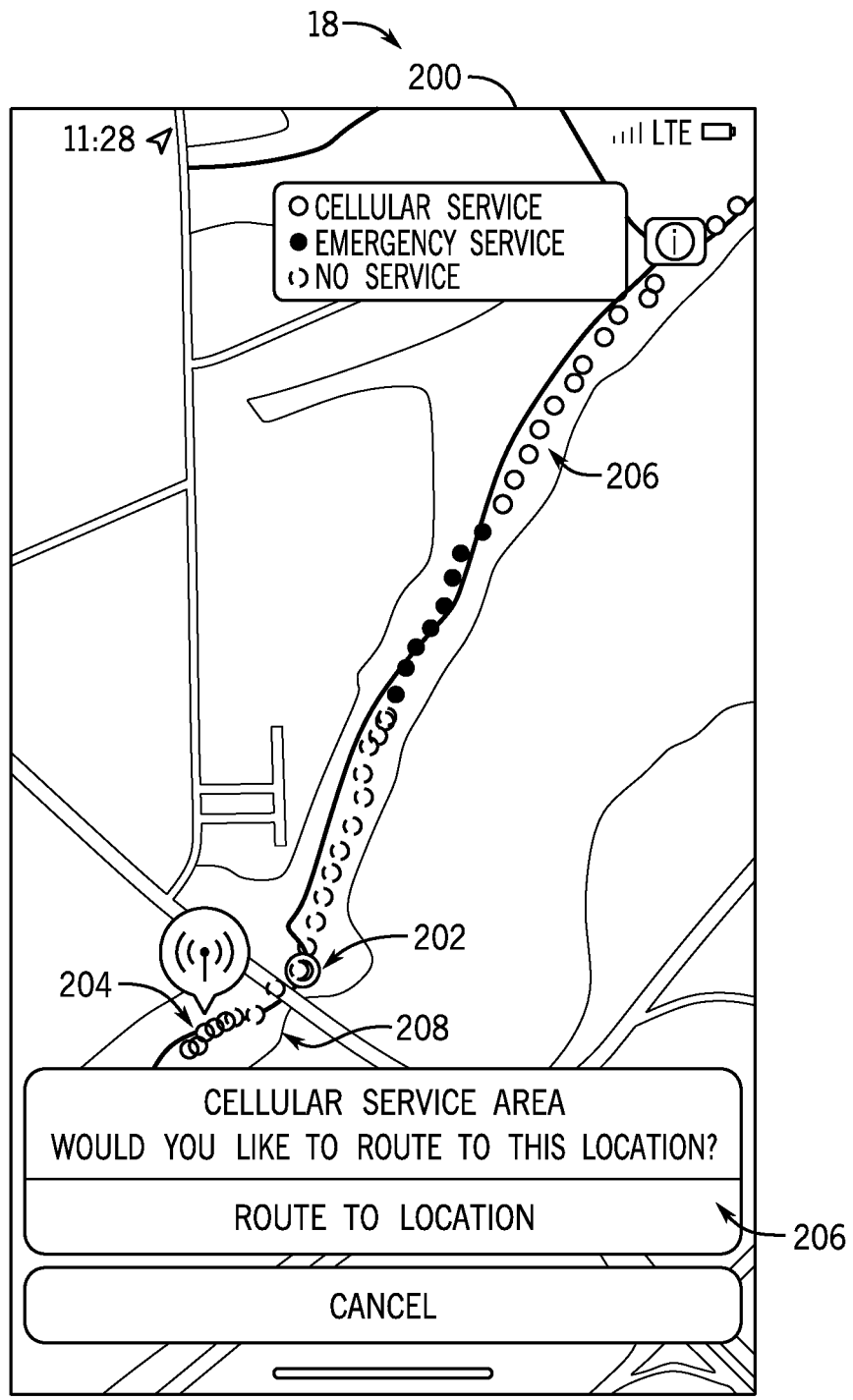
FIG. 10 an illustration of a map view of a path for reaching cellular connectivity shown on a display of the user equipment of FIG. 1, according to embodiments of the present disclosure.

The notification 158 may only be displayed if the user equipment 10 is off-grid. In addition, the notification 158 may display a map interface and/or terminate after a threshold period of time. In some embodiments, the notification 158 may enable the user to provide user input, e.g., to select the map interface or dismiss the notification 158. For example, if the user clicks the notification 158, the user equipment 10 may display the map interface. The map interface may include a visual representation of locations without cellular service and locations with cellular service within a threshold distance or range of the user equipment 10. An example of the map interface 200 shown on the display 18 of FIG. 1 is illustrated in FIG. 10. The map interface 200 may show a map of the current location 202 of the user equipment 10, a nearest location 204 to the user equipment 10 with cellular connectivity, and a path (e.g., a path through the no-service area to the nearest location 204). The path may include the tracked path 206 traveled by the user equipment 10 from an area with cellular connectivity to the current location 202 (e.g., a location without cellular connectivity) and a proposed path 208 from the current location 202 to the nearest location 204 with cellular connectivity. Segments of the path may be color-coded to indicate a presence or absence of cellular signal at various points along the path. For example, the segment of the path where no service is present may be specified by a red color, the segment of the path where the user equipment 10 may make emergency calls may be specified by orange color, and a segment of the path where the cellular connectivity is present may be specified by a green color. In an embodiment, the user equipment 10 may make emergency calls when it is able to only connect to a wireless network of a non-subscribed cellular network carrier and/or provider (e.g., a carrier and/or provider to which the user equipment 10 is not subscribed to or associated with). For example, the user equipment 10 that is subscribed to a first cellular network provider (e.g., T-Mobile) may make an emergency call if it is receiving cellular signal from a second cellular network provider (e.g., AT&T).

As shown in FIG. 10, the nearest location 204 with cellular connectivity may be a new location that the user equipment 10 has not traveled through just prior to losing cellular connectivity. In this case, the distance (or time) to the nearest location 204 with cellular connectivity may correspond to the distance of (or time to travel) the proposed path 208 shown as part of the map interface 200. However, in an embodiment, the nearest location 204 with cellular connectivity may be a location that the user equipment 10 has passed prior to loosing cellular connectivity (e.g., if there is no other locations with cellular connectivity in vicinity). In this case, the proposed path 208 may be superimposed on the tracked path 206 and the distance (or time) to reach the nearest location 204 with cellular connectivity may be based on tracked location of the user equipment 10 and the recorded time of cellular connectivity loss.

In an embodiment, the proposed path 208 may take into account the existing transportation infrastructure (e.g., roads, trails, bridges, etc.). For example, the proposed path 208 may not cross a body of water; instead, the proposed path 208 may go over a nearest bridge. In addition, the proposed path 208 may take into account a mode (e.g., walking, biking, and traveling in a car) by which the user equipment 10 is being transported, which may be determined based on the tracked change in position of the user equipment 10. For example, if it is known that the user equipment 10 is being carried by a pedestrian user, then the proposed path 208 may include trails or sidewalks, while, if the user equipment 10 being transported in a car, then the proposed path 208 may include roads. In an embodiment, the map interface 200 may include more than one proposed path 208 to the nearest location 204 with cellular connectivity. In addition, the map interface 200 may include a user input button 210 that the user may select (e.g., by touching the button on a touch screen, or navigating to the button with a cursor and clicking) to be routed to the nearest location 204 with cellular connectivity.

It should be appreciated that the nearest location 204 with cellular connectivity may not necessarily be the location with cellular connectivity that is the shortest distance away from the user equipment 10. In certain cases, obstacles (e.g., geological obstacles, geographical obstacles) such as bodies of water, canyons, private property, construction zones, industrial zones, buildings may lie between the current position of the user equipment 10 and the location with cellular connectivity that is the closest distance away. Thus, in an embodiment, the nearest location 204 with cellular connectivity may be the location with cellular connectivity that may be reached by the shortest proposed path 208 that a user may realistically undertake.

Figure 11:
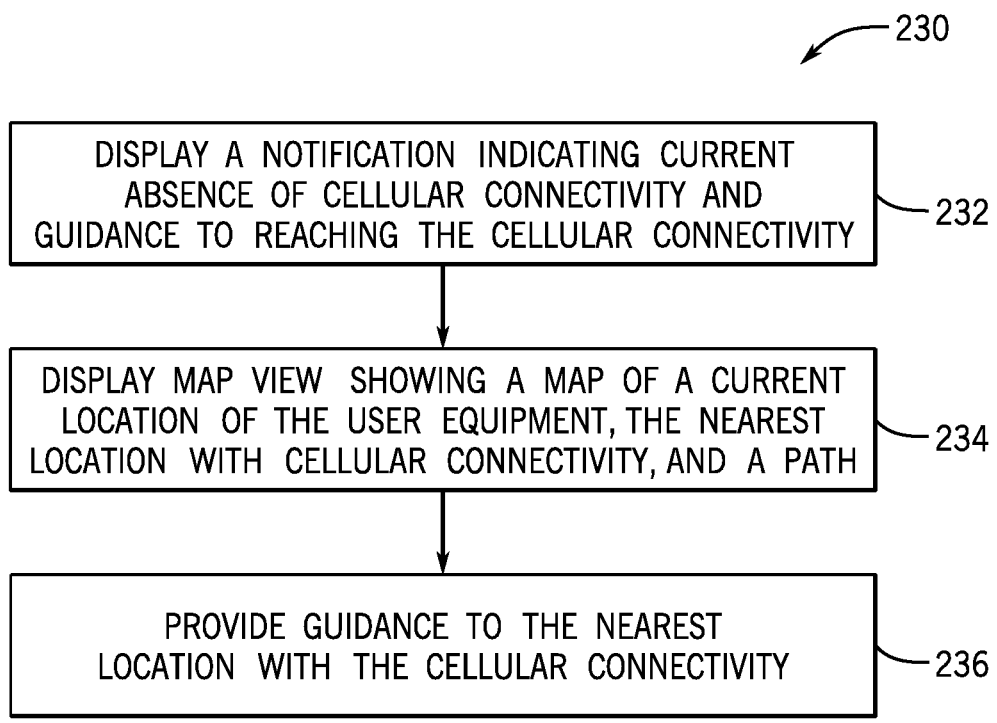
FIG. 11 is a flow diagram of a method for displaying the map view of FIG. 10, according to embodiments of the present disclosure.

FIG. 11 is a flow diagram of a method 230 for displaying a map interface 200 of FIG. 10, according to embodiments of the present disclosure. In process block 232, the processor 12 causes the display 18 to display a notification 158 indicating current absence of connectivity with the first RAT (e.g., cellular connectivity) and guidance to reaching the connectivity with the first RAT. As discussed, display of the notification 158 may be triggered by expiration of the off-grid timer, an indication of a screen unlock operation, or an indication of a software application connection failure. In addition, the notification 158 may indicate time (or distance) that has elapsed since the user equipment 10 has entered an off-grid area and the distance (or time) to the nearest location 204 cellular connectivity. Accordingly, the processor 12 may determine (or receive an indication of) the time elapsed since the user equipment 10 has entered an off-grid area based on the off-grid timer and/or based on the time when the user equipment 10 lost cellular connectivity. In addition, the processor 12 may determine (or receive an indication of) the distance to the nearest location 204 with cellular connectivity based on crowdsourced data and/or the tracked location of the user in the off-grid area.

In process block 234, the processor 12 causes the display 18 to display the map interface 200 showing a map of a current location 202 of the user equipment 10, the nearest location 204 with cellular connectivity, and a path, which includes a path taken by the user equipment 10 from the location of connectivity loss. As discussed, the map interface 200 may show a map of the current location 202 of the user equipment 10, a nearest location 204 with cellular connectivity, and a path, which includes the tracked path 206 traveled by the user equipment 10 from an area with cellular connectivity to the current location 202 (e.g., with no cellular connectivity) and a proposed path 20 from the current location 202 to a nearest location 204 with cellular connectivity. As discussed, segments of the path may be color-coded to indicate the presence or absence of cellular signal at various points along the path. In addition, the map interface 200 may include a user input button 210 that the user may select to be routed to the nearest location 204 with cellular connectivity.

In process block 236, the processor 12 provides guidance to the nearest location 204 with cellular connectivity. In some embodiments, the guidance may be provided by the user equipment 10 based on a user indication or selection. In particular, the user equipment 10 may output audio commands or display navigation commands (e.g., indicating a direction to go, where to turn) that are based, at least in part, on the GNSS position coordinates of the user equipment 10. For example, the processor 12 may cause the user equipment 10 to provide verbal directions, via speakers, earphones, headphones, and so on, in real-time indicating how to reach the nearest location 204 with cellular connectivity. Additionally or alternatively, the processor 12 may cause the display 18 to provide visual directions, such as arrows, maps, landmarks, indicating directions to the nearest location 204 with cellular connectivity.

It should be understood that while the first RAT and the second RAT may include a cellular communication technology and a Wi-Fi communication technology respectively, the first RAT and the second RAT may include any suitable RAT such as Bluetooth, a mesh wireless network technology, etc. However, in some embodiments, neither the first RAT nor the second RAT may include Bluetooth. In addition, certain types user equipment 10, such as dual subscriber identity module (SIM) card devices, may connect to more than two RAT. For example, a user equipment 10 may connect to two different cellular networks (e.g., networks associated with two distinct network providers) in addition to connecting to Wi-Fi. In this case, the user equipment 10 may identify the nearest location with cellular coverage of any of the cellular networks that it may connect with.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

In an embodiment, an electronic device (e.g., the user equipment 10) may include a display, a first receiver configured to receive a first signal associated with a first radio access technology (RAT), a second receiver configured to receive a second signal associated with a second RAT, a global navigation satellite system (GNSS) receiver, and processing circuitry communicatively coupled to the display, the first receiver, and the second receiver. The processing circuitry may be configured to receive an indication that the electronic device lost connection with the first RAT and the second RAT, receive a time and a location from the GNSS receiver based on the indication, and display a notification on the display based on the time and the location.

The processing circuitry may be configured to display the notification based on the time exceeding a threshold, a screen unlock operation, and/or selection of a software application that uses the first receiver.

The software application may include a telephony application, a video telephony application, a web browser application, and/or a media streaming application.

The processing circuitry may be configured to receive an indication of a nearest location with a first connectivity.

The notification may indicate a distance from the location to a current location of the electronic device, and a time to reach the nearest location with the first connectivity from the current location of the electronic device.

The notification may indicate the time elapsed since the electronic device lost connection with the first RAT and the second RAT and a distance to a nearest location with the first connectivity from a current location of the electronic device.

The nearest location with the first connectivity may include the location, a location not visited by the electronic device prior to loosing connection with the first RAT and the second RAT, or both.

The processing circuitry is configured receive an indication that the first connectivity has resumed based on the first receiver receiving the first signal or the second receiver receiving the second signal.

The notification may include a notification preview, pop-up notification, push notification, badge notification, a lock screen notification, an alert, and/or a banner notification.

The first RAT may include a cellular network and the second RAT may include a Wi-Fi network.

In another embodiment, a method may include receiving, via processing circuitry of an electronic device, an indication that the electronic device has lost a first connectivity with a first RAT and a second connectivity with a second RAT and generating, via the processing circuitry, a notification indicating a time elapsed since passing a location where the electronic device has lost the first connectivity and the second connectivity, and a distance to a nearest location with the first connectivity to the first RAT from a current location of the electronic device.

The method may include displaying, via a display of the electronic device, a locked screen interface and displaying, via the display, the notification on an unlocked screen interface based on an unlock screen operation.

The method may include displaying, via the display, the notification based on a time received from a GNSS receiver reaching a threshold.

The method may include displaying, via a display of the electronic device, a notification preview on a locked screen interface based on a time received from a GNSS receiver reaching a threshold and displaying, via the display, the notification on an unlocked screen interface based on a screen unlock operation.

The method may include displaying, via a display of the electronic device, an interface of a software application, receiving, via the processing circuitry, an indication of a connection failure of the software application based on the electronic device losing the first connectivity with the first RAT and the second connectivity with the second RAT, and displaying, via the display, the notification on the interface of the software application.

The software application may include a telephony application, a media streaming application, a web browser application, and/or a videoconferencing application.

In yet another embodiment, one or more tangible, non-transitory, computer-readable media, may include instructions that cause processing circuitry to receive an indication that an electronic device has lost first connectivity with a first RAT and a second connectivity with a second RAT, receive a time and a location form a GNSS receiver based on the indication, and generate a notification based on the time reaching a threshold, a screen unlock operation, or selection of a software application that uses the first connectivity or the second connectivity, the notification indicating a time elapsed since the electronic device lost connectivity with the first RAT and the second RAT and a distance to a nearest location with a connectivity to the first RAT from a current location of the electronic device.

The instructions may cause the processing circuitry to stop receiving the time and the location form the GNSS receiver based on an indication that the electronic device gained the first connectivity, the second connectivity, or both.

The instructions may cause the processing circuitry to receive an indication of the nearest location with the first connectivity with the first RAT based on data including coordinates of known locations without the first connectivity with the first RAT and without the second connectivity with the second RAT and corresponding nearest locations with the first connectivity.

The first connectivity may include a cellular connectivity, a Wi-Fi connectivity, and/or a Bluetooth connectivity and the second connectivity may include a cellular connectivity, a Wi-Fi connectivity, and/or a Bluetooth connectivity.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:
1. An electronic device comprising:
a display;
a first receiver configured to receive a first signal associated with a first radio access technology (RAT);
a second receiver configured to receive a second signal associated with a second RAT;
a global navigation satellite system (GNSS) receiver; and
processing circuitry communicatively coupled to the first receiver and the second receiver, the processing circuitry configured to
download crowdsourced data based on the second receiver receiving the second signal, the crowdsourced data comprising coverage information of a first RAT,
receive a location of a first connectivity loss and begin receiving a current location of the electronic device from the GNSS receiver based on an indication that the first receiver lost first connectivity with the first RAT and the second receiver lost second connectivity with the second RAT,
receive an indication of a nearest location with the first connectivity based on the current location of the electronic device and on the crowdsourced data, the nearest location with the first connectivity comprising a location where the first receiver receives the first signal associated with the first RAT, and
generate a map interface to be displayed by the display, the map interface indicating the current location of the electronic device, the nearest location with the first connectivity, and a path, the path comprising a tracked path of the electronic device and a proposed path from the current location of the electronic device to the nearest location with the first connectivity.

2. The electronic device of claim 1, wherein the path comprises a first segment of the path where the first connectivity is not present, a second segment of the path where emergency connectivity is present, a third segment of the path where the first connectivity is present, and wherein each segment of the path has a different color.

3. The electronic device of claim 1, wherein the map interface comprises an input button configured to trigger routing to the nearest location with the first connectivity.

4. The electronic device of claim 1, wherein the map interface comprises a map of an area within a threshold distance of the current location of the electronic device.

5. The electronic device of claim 1, wherein the crowdsourced data comprises tuples of GNSS coordinates of known locations without the first connectivity and corresponding nearest locations with the first connectivity that are within a threshold distance of the electronic device.

6. The electronic device of claim 1, wherein the proposed path comprises sidewalks or trails if the electronic device is carried by a pedestrian and the proposed path comprises roads if the electronic device is transported in a car.

7. The electronic device of claim 1, wherein the processing circuitry is configured to cause the display to display the map interface based on the display displaying a notification, wherein the notification indicates a current absence of the first connectivity and a guidance to reaching the first connectivity.

8. The electronic device of claim 1, wherein the processing circuitry is configured to update the crowdsourced data based on the crowdsourced data having been downloaded before a calendar date.

9. The electronic device of claim 1, wherein the first signal comprises a cellular signal and the second signal comprises a Wi-Fi signal.

10. The electronic device of claim 1, wherein the crowdsourced data comprises known locations with a first connectivity with the first RAT and known locations without the first connectivity within a threshold distance of the electronic device.

11. The electronic device of claim 1, wherein the processing circuitry is configured to provide, via the display, a speaker of the electronic device, or both, navigation commands for reaching the nearest location with the first connectivity with the first RAT.

12. A method comprising:
downloading, via processing circuitry of an electronic device, crowdsourced data based on a first receiver receiving a first signal associated with a first radio access technology (RAT), the crowdsourced data comprising known locations with a first connectivity with the first RAT and known locations without the first connectivity within a threshold distance of the electronic device;
receiving, via the processing circuitry, a current location of the electronic device from a global navigation satellite system (GNSS) receiver based on the first receiver losing the first connectivity with the first RAT and a second receiver losing a second connectivity with a second RAT;
receiving, via the processing circuitry, an indication of a proposed path from the current location of the electronic device to a nearest location with the first connectivity based on the current location of the electronic device and on the crowdsourced data; and
receiving, via the processing circuitry, an indication of a tracked path of the electronic device from a location with the first connectivity to the current location of the electronic device received from the GNSS receiver.

13. The method of claim 12, wherein the proposed path avoids obstacles comprising bodies of water, canyons, buildings, industrial zones, construction zones, or any combination thereof.

14. The method of claim 12, wherein the crowdsourced data comprises metadata collected from various mobile devices, the metadata comprising GNSS coordinates of the various mobile devices and indications of a presence of the first connectivity at each GNSS coordinate of the GNSS coordinates.

15. The method of claim 12, comprising displaying, via a display of the electronic device, a map interface comprising the current location of the electronic device, the nearest location with the first connectivity, a path comprising the tracked path and the proposed path, a map of an area that comprises the current location, the nearest location with the first connectivity, and the path, or any combination thereof.

16. The method of claim 15, comprising:
receiving, via the processing circuitry, an indication of a first segment of the path based on the crowdsourced data, the first segment comprising locations where the first receiver is not receiving the first signal; and
displaying, via the display, the first segment in a first color as part of the map interface.

17. The method of claim 15, comprising:
receiving, via the processing circuitry, an indication of a second segment of the path based on the crowdsourced data, the second segment comprising locations where the first receiver is receiving the first signal from a non-subscribed RAT, and
displaying, via the display, the second segment in a second color as part of the map interface.

18. The method of claim 15, comprising:
receiving, via the processing circuitry, an indication of a third segment of the path based on the crowdsourced data, the third segment comprising locations where the first receiver is receiving the first signal, and
displaying, via the display, the third segment in a third color as part of the map interface.

19. One or more tangible, non-transitory, computer-readable media, comprising instructions that cause processing circuitry to:
display, via a display of an electronic device, a notification indicating current absence of a first connectivity with a first radio access technology (RAT) and a guidance to reaching the first connectivity;
display, via the display, a map interface comprising a proposed path from a current location of the electronic device to a nearest location with the first connectivity with the first RAT; provide, via the display, a speaker of the electronic device, or both, navigation commands for reaching the nearest location with the first connectivity with the first RAT; and
download crowdsourced data associated with a first location based on second receiver receiving a second signal, the crowdsourced data associated with the first location comprising known locations with the first connectivity and known locations without the first connectivity within a threshold distance of the first location.

20. The one or more tangible, non-transitory, computer-readable media of claim 19, wherein the instructions cause the processing circuitry to update the crowdsourced data associated with the first location based on the crowdsourced data associated with the first location being stored in a memory of the electronic device.

\* \* \* \* \*